Figures 1, 2:
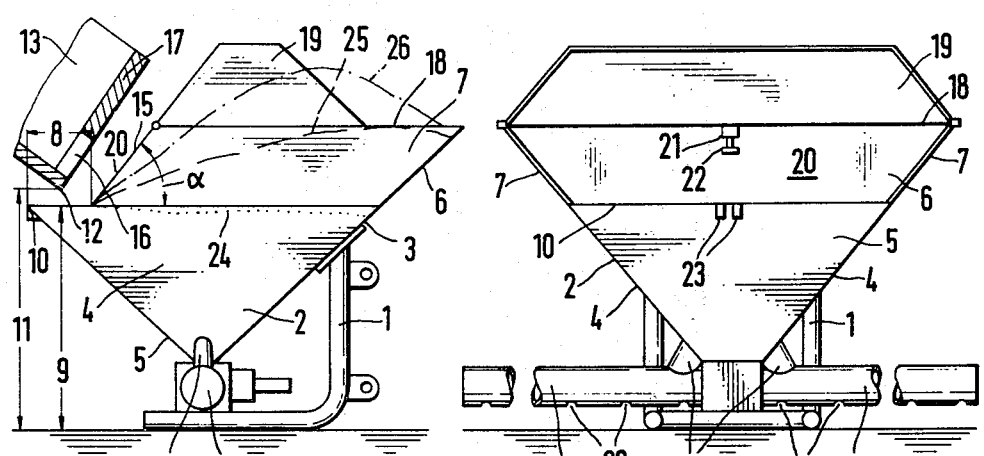

United States Patent [19]

Dreyer

[11] 4,175,705

[45] Nov. 27, 1979

[54] MACHINE FOR THE SPREADING OF MATERIAL IN GRANULAR AND POWDER FORM

[75] Inventor: Heinz Dreyer, Hasbergen-Gaste, Fed. Rep. of Germany

[73] Assignee: Amazonen-Werke H. Dreyer, Hasbergen-Gaste, Fed. Rep. of Germany

[21] Appl. No.: 793,448

[22] Filed: May 3, 1977

[30] Foreign Application Priority Data

May 8, 1976 [DE] Fed. Rep. of Germany ....... 2620413

[51] Int. Cl.² ..................... A01C 17/00; B65G 65/30; E01C 19/20
[52] U.S. Cl. .................................. 239/651; 239/661; 298/27
[58] Field of Search ............... 239/651, 657, 661, 664, 239/682, 687; 222/160, 181, 185, 608; 105/247, 248; 296/15; 298/24–37; 214/44 R

[56] References Cited

U.S. PATENT DOCUMENTS

| | | | |
|---|---|---|---|
| 1,508,210 | 9/1924 | Bangert | 239/657 |
| 2,209,555 | 7/1940 | Beach et al. | 239/664 |
| 2,301,502 | 11/1942 | Arndt | 239/657 X |
| 2,976,643 | 3/1961 | Chafer | 239/661 X |
| 3,164,387 | 1/1965 | van der Lely | 239/661 |
| 3,593,890 | 7/1971 | MacKinnon | 222/608 X |
| 3,931,934 | 1/1976 | Smith | 239/657 |

FOREIGN PATENT DOCUMENTS

| | | | |
|---|---|---|---|
| 1136865 | 9/1962 | Fed. Rep. of Germany | 239/682 |
| 1457876 | 5/1969 | Fed. Rep. of Germany | 239/661 |
| 2319308 | 5/1974 | Fed. Rep. of Germany | 239/661 |

OTHER PUBLICATIONS

*John Deere 300 Spin Spreader,* Operator's Manual OM-M19115M.

*Primary Examiner*—Robert B. Reeves
*Assistant Examiner*—Andres Kashnikow
*Attorney, Agent, or Firm*—Sprung, Felfe, Horn, Lynch & Kramer

[57] ABSTRACT

A machine for spreading material in granular and powder form which comprises a hopper-shaped supply container and a distributing mechanism receptive of material from the container for spreading same during movement of the machine. The container has inwardly and downwardly extending walls, wherein the upper edge of the rear container wall, when the machine is in the loading position and untilted, has a distance from the ground which is smaller than the minimum distance from the ground to the edge of a dump body of a transport vehicle when the dump body is in the tilted position. The front container wall and the side container walls each include an upwardly extending prolongation connected thereto. The prolongations of the side container walls adjoin the prolongation of the front container wall.

13 Claims, 4 Drawing Figures

U.S. Patent  Nov. 27, 1979  4,175,705

MACHINE FOR THE SPREADING OF MATERIAL IN GRANULAR AND POWDER FORM

BACKGROUND

The invention relates to a machine for the spreading of material in granular and powder form, which is equipped with a supply container whose walls extend downwardly in the manner of a hopper, from which the material is fed to a distributor means, and in which, when the machine is in the loading position, the upper margin of the rear container wall is at a distance from the ground which is smaller than the generally common minimum distance from the ground of the lowermost edge of the dump body of a dump truck with the said dump body in the dumping position.

A machine of this type has been disclosed in German Pat. No. 23 19 308. In this machine it is advantageous that its supply container can be filled conveniently and quickly by hand with material from a bulk container and from the flat or tilted floor of the body of a truck, due to its low structural height in the loading position. It is a considerable disadvantage, however, that the supply container has a relatively small capacity, so that, although the reloading of the supply container is accomplished quickly due to its ease of loading, frequent stops are required for the purpose, and this greatly reduces the surface output of the machine.

Also, German Offenlegungsschrift No. 14 57 876 discloses a machine for the spreading of material in granular and powder form, in which the front wall of its supply container as seen in the top plan view, has surfaces extending slantingly downward, while the rear container wall has a planar surface extending straight from the one lateral container wall to the other. Furthermore, the rear container wall is equipped with a prolongation extending in part beyond the lateral container walls, these prolongations being inclined towards the center of the supply container. From this it necessarily follows that the rear edges of the prolongations of the lateral container walls are inclined forwardly.

This machine is characterized by a great holding capacity. It is disadvantageous, however, that the filling of its supply container by hand is extremely strenuous and time-consuming due to its great structural height even when the machine is in the lowered, loading position, and cannot be performed at all from a bulk material container or from a dump vehicle unless the material is also supposed to be transferred entirely by hand. It is furthermore disadvantageous that this machine, in spite of the rearwardly facing surfaces of the front container wall, can be hitched to a tractor only at such a great distance from the rear axle of the tractor that, when the supply container is full, there is a danger of causing the tractor to rear upward.

Finally, a machine for the spreading of material in granular and powder form is disclosed in German Pat. No. 11 36 865, which is constructed as a trailer-mounted apparatus, and in which the lower portion of the supply container is divided into two funnels separated from one another by a roof-shaped central portion, the bottom outlet extremities of the said funnels being at a relatively great distance from one another. Furthermore, all of the container walls are equipped with prolongations extending upwardly and at an inclination toward the center of the container. In this machine, too, the relatively great carrying capacity is advantageous. It is disadvantageous, however, that the supply container is disposed so high on the machine frame that, in spite of its relatively low construction, filling it presents the same difficulties as in the previously described machine.

THE INVENTION

The invention is addressed to the problem of substantially increasing the carrying capacity of the supply container of the initially described machine while retaining the advantage of convenient and rapid refilling.

This problem is solved by the invention in that the front container wall as well as the lateral container walls are equipped with upward prolongations, and the prolongations of the lateral container walls adjoin the prolongation of the front container wall.

With these measures, when the filling is performed, the material can be poured against the front and side walls of the supply container, as will be described in detail hereinbelow, up to the level of the prolongations, so that the desired substantially greater amount of material can be carried per container load. If the prolongations are releasably disposed on the supply container, the machine in the form of a tractor-mounting apparatus, can, after the removal of the prolongations, be used also with light tractors, without creating the danger of overburdening such tractors.

The invention furthermore provides that the rear container wall is provided at its two outer portions, as seen transversely of the direction of travel, also with upwardly extending prolongations adjoining the prolongations of the lateral container walls. This makes possible an additional increase of the carrying capacity of the supply container.

If the open area of the supply hopper, defined by the extensions, can be closed off by a covering means, the material can be piled up during the filling process to a level above the upper margin of the prolongations, and after the filling process it can be pushed against the covering means. This additionally increases the carrying capacity of supply container.

In accordance with the invention, the rear edges of the prolongations of the lateral container walls are furthermore to be inclined forwardly. By this measure, which is independent of the tilting of the prolongations, the supply container is especially suitable for loading from a dump truck body which is generally provided with a gate in its back wall for loading the material into the hoppers of spreading machines. Nevertheless, the truck with its dump body can be backed up with its gate closed, directly to the rear wall of the supply container of the machine without interference from the prolongations of its lateral container walls.

In a preferred embodiment, the invention furthermore provides that the front container wall, as seen in top plan, has surfaces facing slantingly rearward on both sides, in a manner known in se, while the rear container wall is in the form of a planar surface extending from the one side wall of the container to the other, and that the margin of the rear container wall is equipped with a lip below the open area of the supply container defined on both sides by the prolongations. This construction provides an especially desirable shape for the filling of the supply hopper and at the same time a stable type of construction. Furthermore, without any appreciable loss of the optimum carrying capacity of the supply container, the additional advantage is obtained by these measures that the machine, whether constructed as a tractor-mounted spreader or as a trailer type of spreader, can be arranged more closely to the tractor that moves it. If it is in the form of a trailer type of spreader, the special advantage is better maneuverability without the danger of the front container wall coming into contact with the rear wheels of the tractor in tight turns. If it is constructed as a tractor-mounted spreader, the torque that is produced in the elevated spreading position by the weight of the machine and the distance between its center of gravity and the rear axle of the tractor is substantially reduced thereby, so that even with a tractor whose weight is light but sufficient to carry it, there is no danger of causing the tractor to rear up.

If the prolongations are, in a manner known in se, inclined towards the center of the supply container, the increased carrying capacity of the supply container is combined with an assurance against spilling the material from the filled container at the beginning of each spreading action. This measure is important particularly in operations on hilly terrain.

In an additional preferred embodiment, the invention provides that the lower portion of the supply container is divided by a roof-shaped central piece in a known manner into at least two outlet funnels arranged side by side transversely of the direction of travel, the bottom outlet extremities of the said funnels being at a relatively great distance apart. This permits the attainment of an especially great carrying capacity in the supply container.

Lastly, the container walls in accordance with the invention are to have, in a known manner, an angle of inclination $\beta$ of 40° from the horizontal plane. This measure permits the achievement of the optimum carrying capacity for each embodiment of the supply container in accordance with the invention.

Figure 3:
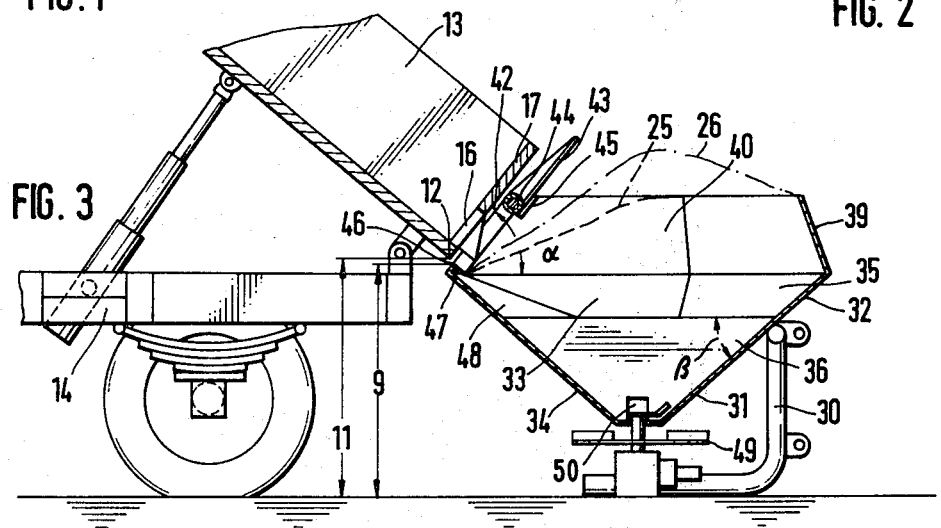
Figure 4:
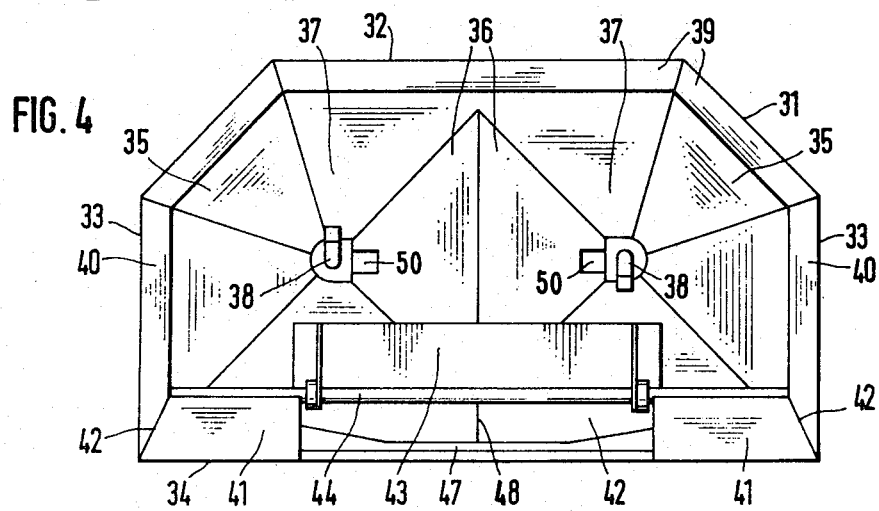

The invention will now be explained with the aid of the embodiments represented in the appended drawings, wherein FIG. 1 is a side elevational view of a machine in accordance with the invention, FIG. 2 is a rear elevational view of the same machine, FIG. 3 is a longitudinal cross section of another machine in accordance with the invention, and FIG. 4 is a top plan view of the machine of FIG. 3.

The machine represented in FIGS. 1 and 2 is constructed as a tractor-mounted machine and has the frame 1 on which the supply container 2 is mounted. This supply container is provided with a front wall 3, two lateral walls 4 and a rear wall 5, which extend downwardly in the manner of a hopper. Furthermore, the prolongation 6 is releasably mounted on the front wall 3, and the prolongations 7 adjoining this prolongation and extending upwardly are mounted on the lateral container walls 4, terminating at the distance 8 from the rear container wall 5. The distance 9 between the ground and the upper edge 10 of the rear container wall 5 is shorter than the distance 11 between the ground and the lowermost edge 12 of the dump body 13, indicated in the uptilted position, of a truck 14 whose rearward portion is represented in longitudinal cross section in FIG. 3. A distance 9 of 890 mm has proven to be sufficient.

To permit the upturned dump body 13 to be driven as far as possible over the edge of the supply container 2 in order to fill same, the rear edges 15 of the prolongations 7 of the lateral container walls 4 are inclined forwardly at an angle of inclination $\alpha$ of 50°. This angle has been chosen because, with flat surfaces, an angle of inclination of 40° generally suffices to cause even more difficulty flowing material to slide downwardly, and in the case of the dump body 13 set at this angle of inclination, its rear wall 17, which is provided with a gated opening 16, is at an angle of inclination of 50°. The angle of inclination $\alpha$ can also have a different magnitude, of course.

At the upper edge 18 of the lateral prolongations 7, the covering means 19 is disposed in a hinged and releasable manner; it consists of a plate bent to a U shape, and it is of such configuration that, when it is in its downwardly pivoted closed position, it precisely fills out the outer contours of the open area 20 of the supply container defined laterally by the prolongations 7. This covering means 19 is locked in its closed position, which is not shown, by means of the rubber toggle fastener 21 whose toggle 22 is placed for this purpose under the projections 23 located on the rear container wall 5.

As it can be seen in FIG. 1, the supply container 2, if it has no prolongations 6 and 7 as in the case of the known machine initially described, i.e., when these prolongations have been removed, can be filled by hand, or from a dump body 13 or from a main supply container, only to the level indicated by the dotted line 24. With the prolongations 6 and 7, filling up to the level indicated by the broken line 25 is possible, the material being pushed from the dump body 13 by hand during loading, until this level is reached. This requires no great effort and can be performed even more quickly by using a shovel or a plate or some other instrument suitable for the purpose. If the supply container 2 is additionally equipped with the covering means 19, then it can be filled up to a level indicated by the dash-dotted line 26, and then, after the filling has been completed and the covering means 19 has been swung down into its closed position, the material piled above the upper edge 18 is pushed into the now covered area 20 of the supply container 2. Thus, by the simple means of the prolongations 6 and 7, plus the covering means 19 if used, a multiplication of the carrying capacity of the supply container can be achieved.

After the supply container 2 has been filled and the machine has been lifted to the working position, the material in the container is delivered through adjustable outlet apertures and the transport tubes 27 to the two spreading augers 28 and broadcast on the soil through the outlet openings 29.

The machine in the form of a tractor-mounted spreader represented in FIGS. 3 and 4 is again equipped with a frame 30 and the hopperlike supply container 31 mounted thereon, which has the front container wall 32, the two lateral container walls 33 and the rear container wall 34. In this case the angle of inclination $\beta$ of these container walls amounts to 40°. Furthermore, as best seen in FIG. 4, the front container wall 32 is provided on both sides with the rearwardly slanting surfaces 35, while the rear container wall 34 has the form of a planar surface extending from the one lateral container wall 33 to the other. Furthermore, the supply container 31 is divided by the roof-shaped middle part 36 into the two outlet funnels 37 whose bottom outlet extremities are at a relatively great distance apart.

In this machine the prolongation 39 is unreleasably mounted on the front container wall 32, and the prolongations 40 adjoining it are unreleasably mounted on the lateral container walls 33, and they are all slightly inclined inwardly toward the center of the container. In addition, the external portions of the rear container wall, as seen transversely of the direction of travel, are also equipped with upwardly extending prolongations 41 which, like the rear edges 42 of the lateral prolongations 40, have an angle of inclination $\alpha$ of 40° towards the center of the container. The open area 42 of container 31, which is left between the rear prolongations 41, can be covered by the covering means 43 in the form of a flat plate. This covering means 43 is articulated releasably on the tubular crossbar 44 which is fastened to the lateral prolongations 40 and extends along the upper margin of the rear prolongations 41. In the elevated position shown in the drawing, the covering means 43 rests against the stop 45, while in the closed position it is held again by a rubber toggle cord, which is not shown, as in the first embodiment. Lastly, the edge 46 of the rear container wall 34 has a lip 47 which is narrower in its middle portion than at its outer extremities and is joined to the roof-shaped middle part 36 by the reinforcing plate 48. This results in an especially great stability for the rear container wall 34, so as to prevent it from being bent during the filling procedure.

As it can best be seen in FIG. 3, the upper margin 46 of the rear container wall 34 has a distance 9 between its open portion 42 and the ground of 890 mm, which is less than the commonly used distance 11 between the lowermost edge 12 of the dump body 13 of the transport vehicle 14 when the dump body is in the uptilted position. Furthermore, the broken line 25 in FIG. 3 again indicates the level of a fill of material with the covering means 43 removed, while the dash-dotted line 26 shows the level to which the material can be brought during the filling action with the covering means 43 disposed on the supply In this machine, after the filling action and the raising of the machine to the working position, the material is delivered from the supply container 31 through the two adjustable outlet apertures 50 to the spreader plate 49, and is broadcast by the latter.

What is claimed is:

1. A spreader for mounting on a tractor for spreading material in granular and powder form, comprising a hopper-shaped supply container having inwardly, downwardly extending front, side, and rear container walls wherein the front container wall and the side container walls each include an upwardly extending prolongation connected thereto, the prolongations of the side container walls adjoining the prolongation of the front container wall, and the rear edges of the prolongations of the side container walls being inclined forwardly, and distributing means receptive of the material from the container for spreading same during movement of the machine, whereby the carrying capacity of the supply container is increased while an open area is provided above the upper edge of the rear wall and between the side walls for loading of the spreader with said material.

2. The machine according to claim 1, wherein the prolongations of the side container walls terminate at a distance before the upper edge of the rear container wall.

3. The machine of claim 1, wherein the rear container wall comprises at its two outer portions as seen transversely of the direction of travel, upwardly extending prolongations adjoining the prolongations of the side container walls.

4. The machine according to claim 1, further comprising covering means for selectively closing the open area.

5. The machine according to claim 4, wherein the covering means includes means pivotally mounting same for movement between the open and closed positions and means for locking same without a tool in the closed position.

6. The machine of claim 5, wherein the pivotal mounting means includes a crossbar disposed at the level of the upper edges of the prolongations of the side container walls and on which the covering means is pivoted, and an element of the locking means is disposed on the lower portion of the covering means.

7. The machine according to claim 1, wherein the rear edges of the side prolongations are inclined forwardly at an angle of inclination of 50°.

8. The machine according to claim 1, wherein the front container wall comprises wall surfaces which as seen in plan view slant rearwardly on both sides, the rear container wall comprises a planar surface extending from the one side container wall to the other, and a lip is disposed at the upper edge of the rear wall along the lower edge of the open area.

9. The machine according to claim 8, wherein the lip is narrower in the center than at its laterally external ends.

10. The machine according to claim 8, further comprising means dividing the lower portion of the supply container into at least two outlet funnels and disposed adjacent one another transversely of the direction of travel, the lower outlet extremities of said funnels being at a relatively great distance from one another and including a roof shaped middle part separating the two funnels.

11. The machine according to claim 10, further comprising a reinforcing plate joining the lip to the roof-shaped middle part beneath the open area of the supply container.

12. The machine according to claim 1, wherein the prolongations are inclined towards the center of the supply container.

13. The machine according to claim 1, wherein the container walls have an angle of inclination of 40° to the horizontal plane.

* * * * *

UNITED STATES PATENT AND TRADEMARK OFFICE
CERTIFICATE OF CORRECTION

PATENT NO. : 4175705
DATED : November 27, 1979
INVENTOR(S) : Heinz Dreyer

It is certified that error appears in the above-identified patent and that said Letters Patent are hereby corrected as shown below:

Column 5, line 35, after "supply" insert --container 31.--.

Signed and Sealed this

Twenty-fifth Day of March 1980

[SEAL]

Attest:

SIDNEY A. DIAMOND

Attesting Officer

Commissioner of Patents and Trademarks